United States Patent

Novak

Patent Number: 5,070,777
Date of Patent: Dec. 10, 1991

[54] SMOKING GRATE FOR DOMESTIC CHARCOAL BARBEQUE GRILLS

[76] Inventor: Michael Novak, 3805 Madison St., Oak Brook, Ill. 60521

[21] Appl. No.: 621,061

[22] Filed: Dec. 3, 1990

[51] Int. Cl.$^5$ .............................................. A47J 37/00
[52] U.S. Cl. .................................. 99/482; 126/25 R; 426/314
[58] Field of Search ................... 426/314, 315; 99/467, 99/482; 126/25 R, 9 R

[56] References Cited

U.S. PATENT DOCUMENTS 4,140,049  2/1979  Stewart .................................. 99/482
4,512,249  4/1985  Mentzel ................................. 99/482

*Primary Examiner*—George Yeung
*Attorney, Agent, or Firm*—Lee, Mann, Smith, McWilliams & Sweeney

[57] ABSTRACT

A smoking grate for conventional domestic barbeque grills that includes a circular food smoking grid having a continuous outer rim and an enlarged air passing aperture centrally of said smoking grid, an open ended tubular cage secured at one end of same to the grate grid about its said aperture in depending relation to such grid and defining a base for support on the grill charcoal support grid that permits the cage to receive a load of charcoal and smoke providing wood chips on top of same, with the smoking grid rim having a pair of lift handles secured thereto at approximately 180 degree positions, whereby, the smoking grate may be substituted for the grill conventional food cooking grid, with the grate charcoal receiving cage resting on the grill charcoal support grid, whereby the cage and charcoal support grid together form a receptacle for the charcoal and wood chips to be applied to the grate cage.

8 Claims, 1 Drawing Sheet

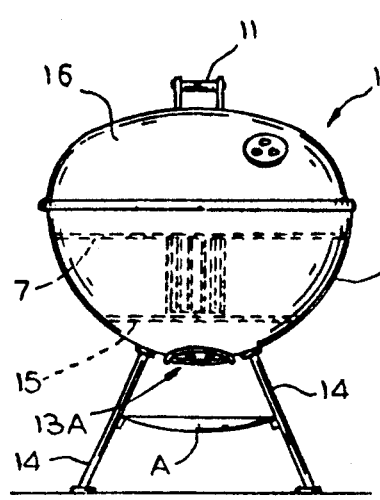
FIG.1
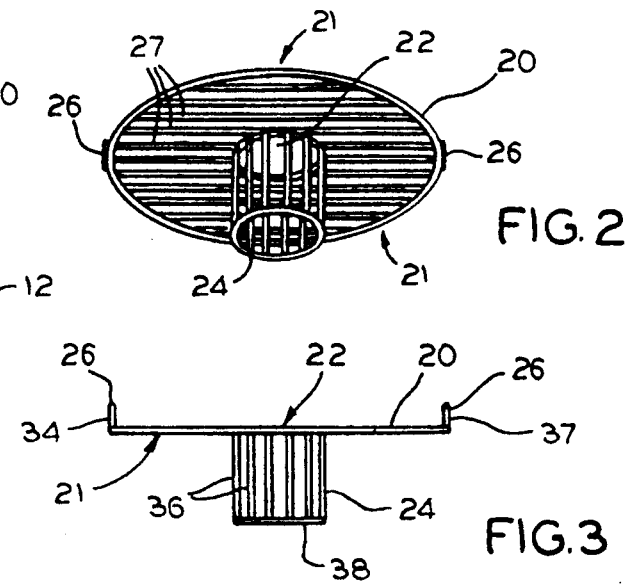
FIG.2
FIG.3
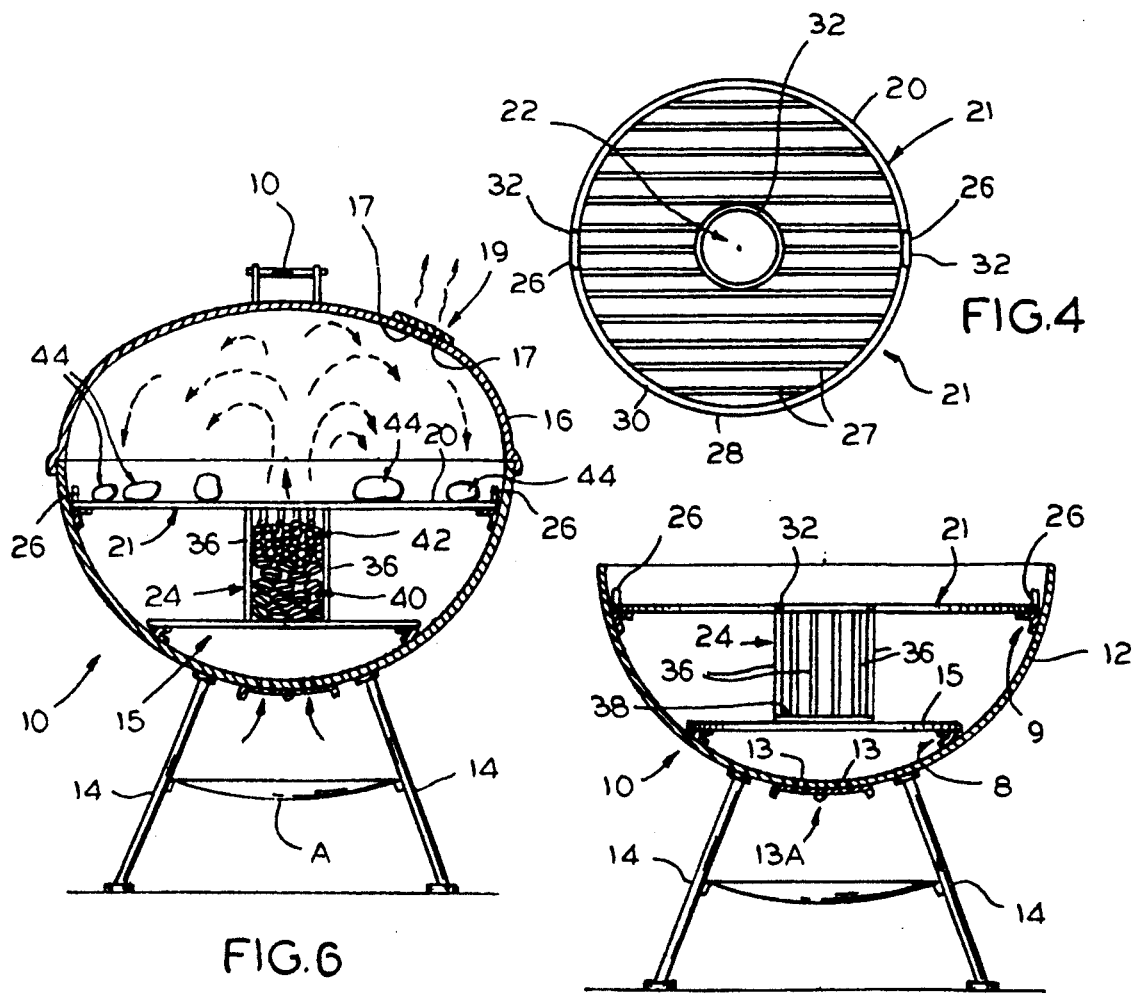
FIG.4
FIG.6
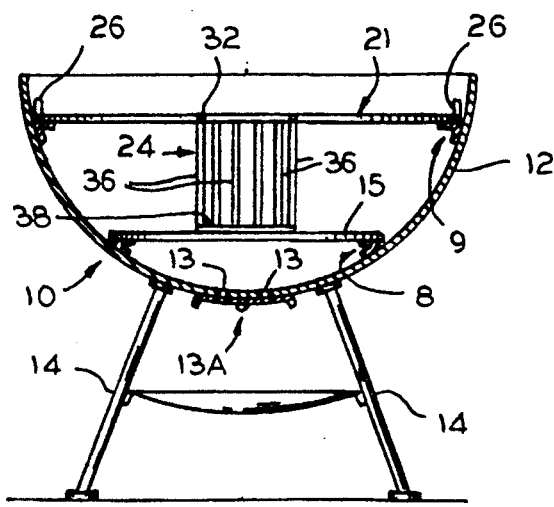
FIG.5

SMOKING GRATE FOR DOMESTIC CHARCOAL BARBEQUE GRILLS

This invention relates to charcoal fired barbeque grills of the type that are widely used for home or domestic outdoor cooking, and more particularly, to a smoking grate therefor, that may be substituted for the usual food cooking grid of such grills, where it is desired to smoke poultry, fish, or animal origin meats instead of cooking them in the usual barbeque grill manner.

So-called "smoking" of foods such as poultry, fish, and animal origin meat, has been long used to preserve such foods, and is still used in area today where refrigeration is not readily available. Smoking has heretofore been accomplished for such foods by soaking them in or injecting them with a brine or salt cure and then subjecting such foods to a low temperature smoke for a long period of time. Both the curing salts and the chemicals in the smoke preserve the foods and kill the bacteria which cause spoilage. It is generally agreed that the smoke temperature of the smoke when the foods in question are exposed to it should be about 175 degrees F., and that the ideal temperature at the interior of the food being smoked should be in the range of from about 155 degrees F. to about 165 degrees F.; for such temperatures much above 165 degrees F., the curing salts begin to break down. Poultry is generally smoked at higher temperatures and for longer periods of time than fish and animal origin meats, to overcome the higher levels of bacteria poultry is known to have.

It is well known that the so-called smoking of foods imparts a desirable flavor to such food. It has also been found that smoking such foods at higher temperatures and shorter cooking times without using curing salt or the like gives the same flavor without preserving such foods. Thus, such foods will involve less salt and be healthier to ingest.

A principal object of this invention is to provide a smoking grate arrangement for conventional domestic barbeque grills that may be substituted for the conventional cooking grid of the grill, and permit ready smoking of such foods as fish, poultry, and animal origin meat, as an alternate way of cooking such foods.

Another principal object of this invention is to provide a smoking grate arrangement for conventional barbeque grills that in being arranged for substitution for the conventional cooking grid of the grill and mounting in operating position within the grill, provides all the grill user's needs to effect smoking of such foods by the following appropriate steps for smoking the foods.

Yet another important object of the invention is to provide a smoking grate arrangement for conventional domestic barbeque grills that provides a centrally located, open ended, cage for receiving a layer of the familiar charcoal briquets on which is disposed a layer of smoke providing wood chips (that may be formed, for instance, from hickory, mesquite, or fruit woods) and in the path of the controlled air draft action provided by conventional grills, with the smoking grate being formed thereabove and thereabout with a smoking grid on which the food being smoked may be placed to distribute same thereabout, and with the cage providing the support within the grill that positions its food support in upright horizontal position that may be at the same level within the grill as conventional cooking grids.

In accordance with the invention, the smoking grate arrangement of the present invention is devised for use with the widely used conventional domestic or home barbeque grill that comprises the familiar open top bowl that includes a floor having draft aperturing centrally thereof to provide upwardly acting air draft action, with the bowl including an air draft control device for controlling the air draft action upwardly of the bowl, a charcoal support grid horizontally and removably mounted in the lower portion of the bowl over the bowl floor and its aperturing, the usual food cooking grid that is removably mounted in the bowl above the charcoal grid, and a cover removably mounted on the bowl top for affecting closed cooking purposes and including adjustable vent means for controlling the air discharge from the grill, for which is provided, in accordance with the invention, a supplemental food smoking grate that comprises a planar grid of annular configuration defining an outer continuous rim and a central aperture to the underside of which is affixed about such aperture an open ended tubular cage that is to rest, in use, on the grill charcoal grid and take the place of the grill conventional food grid, when the grill top is removed for smoking purposes. The smoking grate includes lifting handles that are provided approximately 180 degrees apart at the smoking grate grid rim for application and removal purposes.

The grill bowl may have the usual legs or the like for supporting the grill and disposing its grids horizontally.

The smoking grate arrangement of this invention is in the nature of a separate smoking appliance for the conventional barbeque grill, with the smoking grate being used for smoking purpose by removing the grill top and food supporting grid, and applying the smoking grate to the grill through the open top of the bowl, with the grate cage resting on the central portion of the charcoal grid directly above the bowl floor aperturing (for air draft purposes), with the smoking grate grid then being substantially horizontally disposed within the confines of the grid bowl.

With the smoking grate in the thus indicated operating position, while the grill top remains off, a suitable fuel, that preferably is charcoal in the form of the familiar briquets, is applied to the cage through the smoking grate aperture, which charcoal will thus now rest directly on the charcoal grid; on top of the charcoal is disposed the wood chips that are to provide the smoke. The food to be smoked is distributed about the top of the smoking grate cooking grid, and the charcoal is ignited in one of the usual manners (which may involve electrical heat source), after which the grill top is put on the bowl in its usual operating position for cooking purposes, with the result that the air draft is directly through the charcoal and may be controlled at the cover vent, with the cover bottom draft control device being set and left fully open. It has been found that one load of approximately one pound of the indicated charcoal will burn approximately ten hours at a temperature in the range of from about 150 degrees F. to about 200 degrees F., with the food smoking being continued as necessary for smoking, depending on whether the food being smoked is fish, poultry, or animal source meat, the taste of the user of the grill, etc.

Other objects, uses, and advantages will be obvious or become apparent from a consideration of the following detailed description and the application drawings in which like reference numerals indicate like parts throughout the several views.

In the drawings:

FIG. 1 is a diagrammatic elevational view of a conventional domestic barbeque grill, equipped with a smoking grate in accordance with the present invention, showing the smoking grate (within the grill) in dashed lines resting on the grill charcoal grid, which is also shown in dashed lines;

FIG. 2 is a diagrammatic perspective view of the smoking grate arrangement comprising the present invention;

FIG. 3 is a plan view of the smoking grate arrangement shown in FIG. 2;

FIG. 4 is a top plan view of the smoking grate arrangement shown in FIGS. 2 and 3;

FIG. 5 is a diagrammatic vertical sectional view of the charcoal grill bowl of FIG. 1 shown with the grill cover and the conventional food cooking grid removed and the smoking grate arrangement of the present invention applied in its operating position within the grill, on top of the grill bowl charcoal grid; and FIG. 6 is a view similar to that of FIG. 5, with the grill cover applied thereto, and the grill as equipped with my smoking grate being utilized to smoke articles of food.

However, it is to be distinctly understood that the specific drawing illustrations provided are supplied primarily to comply with the requirements of the Patent Laws, and that the invention is susceptible of modifications and variations that will be obvious to those skilled in the art, and that are intended to be covered by the appended claims.

Referring first to FIGS. 1-4, the barbeque grill itself is indicated by reference numeral 10 and is entirely conventional, and having the usual bowl 12 that is supported by legs 14 (usually three or four in number, though only two are illustrated) and conventional cover 16 that is of the usual hemispherical shape and is equipped with conventional handle 11 to aid in applying and removing the cover from the bowl 12, also known as a kettle.

As is also conventional, the bowl 12 is suitably apertured as at 13 (see FIG. 5) for air draft purposes, with the openings defined by apertures 13 being conventionally controlled by conventional air draft control device 13A equipped with the usual handle for adjusting same as needed. The cover 16 is also suitably apertured as at 17 (see FIG. 6) and provided with a conventional draft control device 19 that includes the usual handle for adjusting the effective opening of the apertures 17 as desired by the user of the grill 10.

Further, the grill 10 is conventionally provided with the conventional lower grid 15 resting on spaced angle brackets 8, with charcoal briquets normally being applied to the grid 15. Conventionally, the familiar cooking grid (not shown) is positioned within the bowl 12 above the grid 15, resting on suitable grid support brackets 9, for the purpose of conventionally grilling food products in the grill 10 under the heat generated by ignited charcoal briquets on the grid 15.

The smoking grate arrangement 21 of this invention is shown by itself in FIGS. 2, 3, and 4, and generally comprises circular grate 20 that is centrally apertured as at 22, and that has an open ended annularly configured cage 24 affixed thereto about the aperture 22.

As indicated in FIGS. 1, 5 and 6, the smoking grate 21 in use is applied to the grill bowl 12 when smoking of the food to be cooked is desired, with the conventional food support grid being removed for this purpose and the smoking grate cage 24 resting on the conventional charcoal grid 15. It is preferable that the cage 24 is proportioned in length so that when it rests on the grid 15, the grid 20 thereof also rests on the conventional supports 9, for smoking purpose use without having to be concerned about tilting of the grate 21 when the food to be smoked is being applied thereto, though obviously grate 21 may be provided with other forms of supporting same against tilting, as by engaging the bowl 12.

The grate 21 is completed by a pair of handles 26 secured to the grid 20 at positions of approximately 180 degrees apart, and upwardly directed (as indicated in FIG. 3) for ease in applying and removing the grate 21 with respect to the grill 10 when the cover 16 of the grill 10 is removed.

The grate 20 is actually a grid that may be formed in the same manner as conventional barbeque grids, as by being formed from a plurality of spaced metallic rods 27 suitably welded to rodding 28 of the same type that is arcuate in nature and forms the rim of the grid 20. The aperture 22 is defined by an inner rim 32 of the same sort to which the rods 27 are welded or otherwise secure in place. The handles 26 each are of the U shaped type formed from appropriately angled U shaped members 34 that are also suitably affixed as by welding to the rodding 28 where indicated in FIGS. 3 and 4.

With regard to the cage 24, it comprises rectilinear rods 36 of the same type as rods 27 and fixed as by welding between the suitable rodding forming annular rings 32 and 38 at either end of the cage 24.

As indicated in FIGS. 5 and 6, assuming that smoking is desired, the cover 16 of the grill 10 is removed, and smoking the grate 21 is applied thereto, in place of the usual cooking grid with the grate cage 24 resting on the conventional charcoal grid 15 and centered within the grill so that the rim 28 of the grate 21 seats on the brackets 9, if the cage 24 is proportioned for that type of fit. A suitable charge of charcoal briquets is applied to the lower portion of the cage 24, as indicated at 40 in FIG. 5, on top of which are disposed wood chips of the type employed for smoking purposes, such as hickory wood chips, where indicated at 42. The cover may be left off for igniting of the charcoal, and the bottom vent device 15 is disposed to be fully open for ventilation.

After the smoke starts to form, or prior to this if so desired, the food products may be disposed about the grid 20, and the cover replaced on bowl 12. By appropriately controlling the air flow control device 19, the smoke generated by the burning charcoal and wood chips 42 moves upwardly and about the interior of the now closed grill 10 (as indicated by the arrows in the upper portion of FIG. 6), with the temperature within the grill 10 being controlled only by the top device 19.

It has been found in using the grate 21, one load of charcoal of the type illustrated in FIG. 6 will keep the temperature within the grill 10, arranged as indicated in FIGS. 5 and 6, for approximately ten hours at a temperature of about 150 degrees F. to about 200 degrees F., which has been found to be the ideal temperature for smoking fish, poultry, and animal origin meat, with the time of smoking being in accordance with the needs for the particular food 44 being cooked. The ashes that fall into the open control device 15 fall into the conventional dish A that is suitably supported underneath same. During the cooking period the control of the temperature is achieved solely by adjusting the control device 19.

After the smoking has been completed, based on the time involved for each food item 44 to be smoked, the cover 16 is removed for access to the freshly smoked food products 44. If so desired, the grate 21 then may be removed from the grill 10 by lifting same upwardly and exteriorly of the grill 10 using its handles 26 (using heat insulating gloves if necessary), for replacement of the conventional food grill, as desired.

The withdrawal of the grate 21 leaves the resulting ash material in a pile on the grid 15, to the extent that the ash involved has not dropped into the pan A. The remainder of the ash may be removed from the grill 10, using a suitable implement to move the ash toward the control device 15 and thus into the pan A.

It will be apparent that the grate 21 may have its grid 20 shaped to conform to the horizontal section of the grill 10, and thus it may be of quadrilateral configuration if so desired. Of course, the cage 24 and the central aperture 22 may also be of any desired configuration, such as quadrilateral.

It is also apparent that if so desired, the aperture 22 may also be provided with a pivotally connected cover to prevent the food being smoked from falling into the burning chips and charcoal. Such cover if employed preferably should be suitably hinged to the grid 20 for swinging into and out of overlying relation with regard to the aperture 22. However, it is preferred that the aperture 22 remain open and where the grid 20 is proportioned to be in engagement with the bowl, either thereabout or at spaced points thereabout, such aperture cover is not necessary and has been omitted from the illustrated embodiment.

A key feature of the illustrated smoking grate arrangement as applied to its operating relation within grill 10 is the access of the incoming air to the burning charcoal, as the charcoal and chips overlying same lie in the draft path from the lower control device to the upper control device 19. Incidentally, it will be apparent that the upper control device 19 may be at any location near the top of the cover 16, including under handle 10, though the arrangement shown in the illustrated embodiment has proved to be satisfactory.

Other features of the invention are that:

1. Food can also be baked by employing the grate arrangement 21, with higher temperatures that are needed for baking being obtained by opening the top control device 19 accordingly. Thus, the grate arrangement 21 may be employed to bake other foods than those mentioned for smoking.

2. It will also be apparent that the general arrangement illustrated in the drawings is of simplified nature, and readily works within a conventional grill arrangement of the domestic barbeque grill type equipped with suitable bottom and top vents and control devices therefor.

3. Additional charcoal briquets can readily be added into the cage 24 through aperture 22 if needed, by removing the grill cover 16, even though the barbeque grill arranged as shown in FIG. 6 is still hot and is in the process of being used for smoking purposes.

4. As previously indicated, the ash that occurs from smoking tends to fall by its own weight through the open grill device 15 and into the ash collecting pan A.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. For a charcoal barbeque grill of the type defining an open bowl that includes a floor aperture to provide upwardly acting air draft action that includes an air draft control device for controlling the air draft action upwardly of the bowl, a charcoal support grid horizontally mounted in the lower portion of the bowl over the bowl floor, a charcoal food cooking grid having a rim and means for mounting same at its rim in the bowl over and above the charcoal support grid, and a cover removably mounted on the bowl top for closed cooking purposes with the cover being apertured at its upper portion and including an air draft control device for controlling the air discharge from the bowl, a supplemental food smoking grate thereof comprising:

a food smoking grid:

said food smoking grid defining a continuous outer rim and an aperture spaced inwardly of said rim, and a lower tubular open ended cage affixed to said grid about said aperture in depending relation to same, whereby, when food smoking is desired, the cover is removed to open the top of the bowl, the charcoal food cooking grid is removed from the bowl, and said food smoking grate is mounted within the bowl with its tubular cage resting on the charcoal support grid and its food smoking grid facing upwardly, said tubular cage is consecutively charged with charcoal and wood chips in that order, the cover replaced to close the top of the bowl, and the bowl draft control device and the cover draft control device are set to burn the charcoal charge at a predetermined smoking temperature, the grill is arranged to smoke food placed on said smoking grid.

2. The food smoking grate set forth in claim 1 wherein:

said food smoking grid is circular in configuration.

3. The food smoking grate set forth in claim 2 wherein:

said tubular cage is concentric of said smoking grid.

4. The food smoking grate set forth in claim 3, including:

a pair of lifting handles said food smoking grid outer rim in diametrically opposite relation.

5. A food smoking grate for barbeque grills of the type including an open top bowl that includes a floor aperture to provide upwardly acting air draft action and including an air draft control device for controlling the air draft action upwardly of the bowl, a charcoal support grid horizontally mounted in the lower portion of the bowl over the bowl floor, a charcoal food cooking grid and means for removably mounting same in the bowl over and above the charcoal support grid, a cover removably mounted on the bowl top for closed cooking purposes, with the cover being apertured at its upper portion and including an air draft control device for controlling the air discharge from the bowl, said smoking grate comprising:

a generally planar food smoking grid defining a continuous outer rim having a configuration complementing that of the interior of the bowl, said smoking grid defining an aperture within the rim thereof, and a tubular cage affixed to said grid about its said aperture and depending therefrom, said smoking grate in use replacing said charcoal cooking grid, with its said grid serving as the food smoking support and said tubular cage resting on the charcoal support grid, whereby when the smoking grate tubular cage is charged with charcoal and wood chips in that order through said aperture when the cover is removed to open the top of the bowl, and the cover is then replaced to close the top of the bowl, the bowl draft control device and the cover draft control device may be set to provide the heat needed to smoke food on the smoking grate food smoking grid.

6. The food smoking grate set forth in claim 1 wherein:

said food smoking grid and said rim thereof are circular in configuration, with said aperture being centrally located within said grid rim.

7. The food smoking grate set forth in claim 6, wherein:

said tubular cage is fixed to said smoking grid in concentric relation thereto.

8. The food smoking grate set forth in claim 7, including:

first and second lift handles secured to said food smoking grid rim in oppositely disposed relation directed oppositely of the plane of said smoking grid.

* * * * *